United States Patent
Fonseca

(10) Patent No.: US 9,205,376 B2
(45) Date of Patent: Dec. 8, 2015

(54) AUTOMOTIVE ANTI-CONTAMINATION SYSTEM

(71) Applicant: Continental Automotive Systems, Inc., Auburn Hills, MI (US)

(72) Inventor: Moises Castaneda Fonseca, Zapopan (MX)

(73) Assignee: Continental Automotive Systems, Inc., Auburn Hills, MI (US)

(*) Notice: Subject to any disclaimer, the term of this patent is extended or adjusted under 35 U.S.C. 154(b) by 459 days.

(21) Appl. No.: 13/714,500

(22) Filed: Dec. 14, 2012

(65) Prior Publication Data

US 2013/0164184 A1 Jun. 27, 2013

Related U.S. Application Data

(60) Provisional application No. 61/579,129, filed on Dec. 22, 2011.

(51) Int. Cl.

| | | |
|---|---|---|
| *F01N 3/10* | (2006.01) | |
| *F01N 3/18* | (2006.01) | |
| *B01D 53/92* | (2006.01) | |
| *F01N 3/02* | (2006.01) | |
| *F01N 3/08* | (2006.01) | |

(52) U.S. Cl.
CPC ............. *B01D 53/925* (2013.01); *F01N 3/02* (2013.01); *F01N 3/08* (2013.01); *B01D 2258/012* (2013.01); *F01N 2570/04* (2013.01); *F01N 2570/10* (2013.01); *F01N 2610/00* (2013.01); *F01N 2610/10* (2013.01); *F01N 2610/14* (2013.01); *Y02T 10/20* (2013.01)

(58) Field of Classification Search
None
See application file for complete search history.

(56) References Cited

U.S. PATENT DOCUMENTS

| | | |
|---|---|---|
| 5,052,310 A | 10/1991 | Goff et al. |
| 5,572,866 A | 11/1996 | Loving |
| 5,821,190 A | 10/1998 | Kurabayashi et al. |
| 5,853,679 A | 12/1998 | Tabata et al. |
| 5,911,681 A | 6/1999 | Tanaka et al. |
| 5,997,830 A | 12/1999 | Itoh et al. |
| 6,461,579 B1 | 10/2002 | Hachisuka et al. |
| 6,722,123 B2 | 4/2004 | Liu et al. |
| 2010/0071349 A1* | 3/2010 | Kitazawa ............... 60/277 |

OTHER PUBLICATIONS

US. Department of Energy, Intergrated Dry NOx/SO2 Emissions Control System a DOE Assessment, National Energy Technology Laboratory (NETL), 2002/1160.

* cited by examiner

*Primary Examiner* — Walter D Griffin
*Assistant Examiner* — Jelitza Perez

(57) ABSTRACT

An anti-contamination system having a container, a pump, a tube, an exhaust pipe, and a dispenser system. The pump is used to direct a water and calcium oxide solution through the tube to the dispenser system. The high temperature of the exhaust gases is used as a reactor and the exhaust pipe as a controlled atmosphere volume. The heat from the exhaust gas/pipe is used to heat water mixed with calcium oxide to create calcium hydroxide and steam, which is injected by the dispenser system into the exhaust pipe such that the exhaust gas reacts with the steam and the calcium hydroxide. The exhaust pipe is made with stainless steel to avoid corrosion due the chemical reactions that occur inside, and the gases expelled to the atmosphere are clean with only minimal solid residues like calcium sulfate that are troughed away as small pellets, without any pollution contribution.

14 Claims, 1 Drawing Sheet

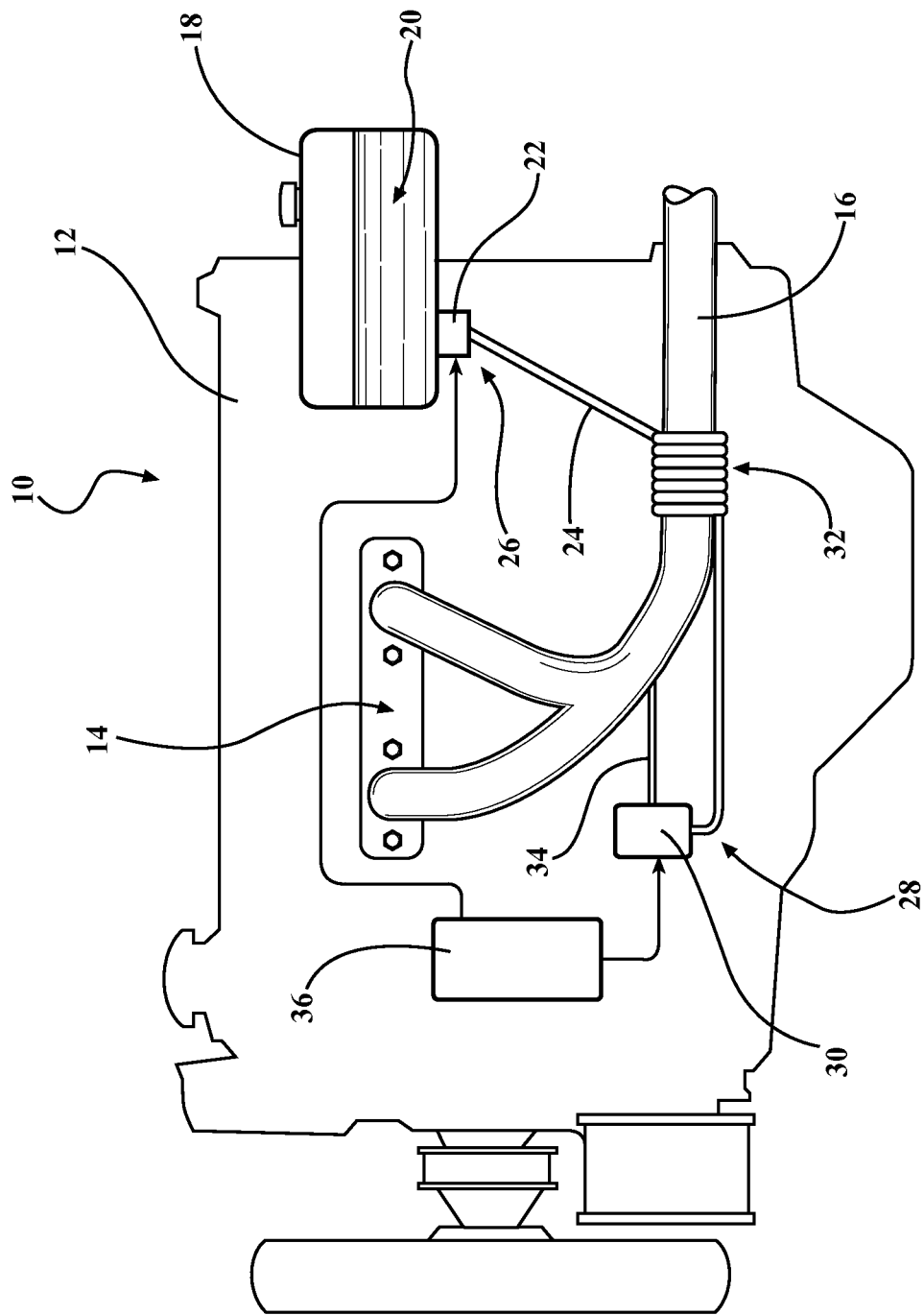

AUTOMOTIVE ANTI-CONTAMINATION SYSTEM

CROSS-REFERENCE TO RELATED APPLICATIONS

This application claims the benefit of U.S. Provisional Application No. 61/579,129 filed Dec. 22, 2011. The disclosure of the above application is incorporated herein by reference.

FIELD OF THE INVENTION

The invention relates generally to an anti-contamination system for the exhaust system of an engine.

BACKGROUND OF THE INVENTION

Many different methods have been implemented to reduce or eliminate harmful exhaust emissions or contaminant gases from a motor vehicle. There are specific regulations in place which require the purification of exhaust gas, eliminating components such as carbon monoxide (CO), nitrogen oxide (NOx), and hydrocarbons (HC) before their emission into the atmosphere. In the natural process for eliminating contaminants in gases, natural cycles use the high atmospheric layers and the ozone and UV rays to recombine the dangerous gases with oxygen and water, forming compounds such as sulfuric acid. The acid rain falls to the earth and any type of calcite is recombined with the acid and returns the pH to an acceptable level.

Many attempts have been made to incorporate the use of chemical reactions in the stream of exhaust gas flowing from an engine through the exhaust system to reduce emissions. Some of these methods used alkaline earth metals or transition metals. However, these methods have been met with limited results.

Accordingly, there exists a need for a automotive anti-contamination system which reduces emissions in the exhaust system of an engine.

SUMMARY OF THE INVENTION

The present invention is anti-contamination system having a container, a pump, a tube, an exhaust pipe, a dispenser system, and an electronic system.

In an embodiment of the invention, the high temperature of the exhaust gases is used as a reactor and the exhaust pipe as a controlled atmosphere volume. The heat from the exhaust gas/pipe is used to heat water mixed with calcium oxide to create a mixture of steam and calcium hydroxide. The mixture of steam and calcium hydroxide is injected into the exhaust pipe in order to recreate the nature process of eliminating contaminants in gases. The exhaust pipe is made with stainless steel to avoid corrosion due the chemical reactions that occur inside, and the gases expelled to the atmosphere are clean with only minimal solid residues like calcium sulfate that are troughed away as small pellets without any pollution contribution.

Water is mixed with an alkaline agent (CaO) and heated with the exhaust gas/pipe. The mixture of steam and calcium hydroxide is injected to the exhaust pipe near the machine but after the oxygen sensor. The high temperature gases from combustion (Sox and NOx) react with the steam and alkaline substance to form solid components, which are not harmful to the environment. The solid residues exit the exhaust pipe.

In an embodiment, the present invention is an automotive anti-contamination system, which includes a container having a solution, a pump mounted to and in fluid communication with the container, and a first tube having a coil portion, where the first tube in fluid communication with the pump. Also included is a dispenser valve, and the first tube is in fluid communication with the dispenser valve. The coil portion of the first tube is substantially wrapped around an exhaust pipe which receives exhaust gas from an engine, and a second tube is in fluid communication with the dispenser valve and the exhaust pipe. A controller is used for controlling the operation of the dispenser valve and the pump. The controller controls the pump to direct the solution from the container, through the first tube, and to the dispenser valve, and the controller also controls the dispenser valve to direct the solution through the second tube into the exhaust pipe, such that the solution reacts with exhaust gas in the exhaust pipe.

The solution is made up of a mixture water and calcium oxide and becomes calcium hydroxide when exposed to the heat from the exhaust pipe. The calcium hydroxide then reacts with the exhaust gas to reduce emissions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

The FIGURE is a schematic view of an engine having an automotive anti-contamination system, according to the present invention.

DETAILED DESCRIPTION OF THE PREFERRED EMBODIMENTS

The following description of the preferred embodiment(s) is merely exemplary in nature and is in no way intended to limit the invention, its application, or uses.

In some embodiments, and with specific reference to the FIGURE, a diagram of an engine having an anti-contamination system is shown generally at 10. The system 10 is part of an exhaust system for an engine 12. The exhaust system includes an exhaust manifold, shown generally at 14, which is in fluid communication with an exhaust pipe 16. The system 10 also includes a container 18, and inside the container is a mixture or solution, generally shown at 20, of water and calcium oxide.

A pump 22 is mounted to the underside of the container 18 such that the solution 20 is able to be pumped by the pump 22 into a first conduit, which in this embodiment is a first tube 24. The tube 24 has a first end, shown generally at 26, connected to the pump 22, and a second end, shown generally at 28, connected to a dispenser valve 30. The tube 24 also includes a coil portion, shown generally at 32, which is wrapped around at least a portion of the exhaust pipe 16.

A second conduit, which in this embodiment is a second tube 34, is in fluid communication with the dispenser valve 30 and the exhaust pipe 16, and the dispenser valve 30 is in electrical communication with and controlled by an electronic controller 36. The electronic controller 36 may be in electrical communication with the electronic control unit (ECU) of the vehicle, a throttle position sensor, a mass flow sensor, crankshaft sensor, an exhaust gas mass sensor, or any other type of sensor which may be used to allow the electronic controller 36 to properly activate the dispenser valve 30 under the desired operating conditions. In an embodiment, the dispenser valve 30 is a pulse width modulated valve, such as a solenoid valve, but it is within the scope of the invention that other types of valves may be used as well.

During operation, the solution 20 is transferred from the container 18 through the tube 24 by the pump 22. As the engine 12 runs, the heat from the exhaust gases in the exhaust pipe 16 heat the solution 20 as the solution passes through the coil portion 32 of the tube 24. After the solution 20 is heated, the solution 20 passes through the second portion of the tube 24, where the dispenser valve 30 directs the solution 20 through the second tube 34, and into the exhaust pipe 16.

The heated solution 20 is in vapor form (i.e., a mixture of steam and calcium hydroxide) when injected into the exhaust pipe 16. Equations 1-5 below describe the various reactions which occur when the anti-contamination system 10 is used for reducing emissions produced by a diesel engine. When the solution 20 is heated by exposure to the exhaust pipe 16, the solution 20 of water and calcium oxide reacts and becomes calcium hydroxide, as shown in Equation 1 below:

$$CaO + H2O \rightarrow Ca(OH)2 \qquad \text{Equation 1}$$

When, the system 10 is used with a diesel engine 12, the diesel engine 12 produces sulfur dioxide. In this configuration, the calcium hydroxide reacts with the sulfur dioxide to produce calcium sulfite and water, as shown in Equation 2 below:

$$Ca(OH)2 + SO2 \rightarrow CaSO3 + H2O \qquad \text{Equation 2}$$

The calcium hydroxide also reacts with carbon dioxide to produce calcium carbonate and water, which is shown in Equation 3 below:

$$Ca(OH)2 + CO2 \rightarrow CaCO3 + H2O \qquad \text{Equation 3}$$

The calcium carbonate reacts with sulfur dioxide to produce calcium sulfite and carbon dioxide, as shown in Equation 4, below:

$$CaCO3 + SO2 \rightarrow CaSO3 + CO2 \qquad \text{Equation 4}$$

Furthermore, the calcium carbonate also reacts with oxygen to produce calcium sulfate, as shown in Equation 5 below:

$$CaSO3 + \tfrac{1}{2}O2 \rightarrow CaSO4 \qquad \text{Equation 5}$$

If the anti-contamination system 10 is used with a gas engine, instead of a diesel engine, the reactions between the gasoline and the solution 20 are shown in Equations 1a, 2a, and 3a, below. When used with a gas engine, the solution 20 is again heated by exposure to the exhaust pipe 16, and the solution 20 of water and calcium oxide reacts and becomes calcium hydroxide, as shown in Equation 1a below:

$$CaO + H2O \rightarrow Ca(OH)2 \qquad \text{Equation 1a}$$

During the combustion process of the engine, the octane in the gasoline reacts with oxygen to produce carbon dioxide and water, as shown in Equation 2a below:

$$2C_8H_{18} + 25O_2 \rightarrow 16CO_2 + 18H_2O \qquad \text{Equation 2a}$$

The calcium hydroxide reacts with the carbon dioxide produced by the combustion process to produce calcium carbonate and water, as shown by Equation 3a below:

$$Ca(OH)2 + CO2 \rightarrow CaCO3 + H2O \qquad \text{Equation 3a}$$

The calcium carbonate exits the exhaust pipe of the vehicle as dust or small pellets, reducing the emissions from the exhaust pipe 16.

This process is controlled by controlling the amount of the solution 20 heated by the exhaust pipe 16, and controlling the amount of heated solution 20 that is distributed to the exhaust pipe 16 by the dispenser valve 30.

In another embodiment the solution 20 of water and calcium oxide is injected to the coil portion 32 of the tube 24 (the heat-interchange stage), where the water in the solution 20 boils, and the valve 30 directs the steam to into the exhaust pipe 16. This valve 30 is a simple "open-close" type of valve, and has the ability to operate several times per second, so the amount of steam is controlled in quantity and time. The operation of the dispenser valve 30 and the pump 22 is controlled by the controller 36, which may be linked to the electronic control unit of the vehicle.

In an alternate embodiment, the dispenser valve 30 is eliminated. The pump 22 is a simple venturi pump which uses the air flow inside the exhaust pipe 16, where the pump 22 is controlled by the electronic controller 36. The use of the electronic controller in this embodiment has more precision and provides for the use of the correct amount of steam: less weight is carried per gasoline load, and better emissions control is achieved.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
an automotive anti-contamination system, including:
a container;
a solution disposed in the container;
a pump connected to the container such that the pump transfers the solution away from the container;
a valve in fluid communication with the pump; and
a controller for controlling the valve and the pump;
a first tube connected to and in fluid communication with the pump, and the first tube connected to and in fluid communication with the valve
a coil portion formed as part of the first tube; and
an exhaust pipe, the coil portion being substantially wrapped around the exhaust pipe;
wherein the controller commands the pump to transfer the solution to the valve, the valve distributes the solution into an exhaust gas stream of an exhaust system, the pump transfers the solution from the pump to the valve through the tube and the solution is heated from exposure to the exhaust pipe as the solution flows through the coil portion.

2. The apparatus of claim 1, the solution further comprising a mixture of water and calcium oxide.

3. The apparatus of claim 2, wherein the mixture of water and calcium oxide becomes hydroxide, calcium hydroxide, and combinations thereof, when exposed to the heat from the exhaust pipe as the solution flows through the coil.

4. The apparatus of claim 3, the exhaust gas further comprising sulfur dioxide and carbon dioxide, wherein the calcium hydroxide reacts with the sulfur dioxide to produce calcium sulfite and water, the calcium hydroxide also reacts with carbon dioxide to produce calcium carbonate and water, the calcium carbonate reacts with sulfur dioxide to produce calcium sulfite and carbon dioxide, and the calcium carbonate also reacts with oxygen to produce calcium sulfate.

5. The apparatus of claim 3, the exhaust gas further comprising carbon dioxide and water, wherein the calcium hydroxide reacts with the carbon dioxide produced by the combustion process to produce calcium carbonate and water.

6. The apparatus of claim 1, further comprising a second tube connected to the valve, and connected to the exhaust pipe, for providing fluid communication between the valve and the exhaust pipe.

7. An automotive anti-contamination system, comprising:
a container;
a solution disposed in the container;
a pump connected to the container such that the pump transfers the solution away from the container;
a valve in fluid communication with the pump;
an exhaust pipe, the valve in fluid communication with the exhaust pipe; and
a controller for controlling the valve and the pump;
a first tube connected to and in fluid communication with the pump and the valve, such that the solution is pumped from the container through the first tube and to the valve by the pump; and
a coil portion integrally formed as part of the first tube;
wherein the controller commands the pump to transfer the solution to the valve, the controller commands the valve to distribute the solution into the exhaust pipe, where the solution mixes with exhaust gas flowing through the exhaust pipe, and the coil portion substantially circumscribes the exhaust pipe, such that solution passing through the coil is heated from exposure to heat from the exhaust pipe.

8. The automotive anti-contamination system of claim 7, further comprising a second tube connected to and in fluid communication with the valve and the exhaust pipe, wherein the valve transfers the solution from the first tube, through the second tube, and into the exhaust pipe such that the solution mixes with the exhaust gas flowing through the exhaust pipe.

9. The automotive anti-contamination system of claim 7, the solution further comprising a mixture water and calcium oxide.

10. The automotive anti-contamination system of claim 9, wherein the mixture of water and calcium oxide becomes hydroxide, calcium hydroxide, and combinations thereof, when exposed to the heat from the exhaust pipe.

11. An automotive anti-contamination system, comprising:
a container having a solution;
a pump mounted to and in fluid communication with the container;
a first tube having a coil portion, the first tube in fluid communication with the pump;
a dispenser valve, the first tube in fluid communication with the dispenser valve;
an exhaust pipe, the coil portion of the first tube substantially wrapped around the exhaust pipe;
a second tube in fluid communication with the dispenser valve, and the exhaust pipe; and
a controller for controlling the dispenser valve and the pump;
wherein the controller controls the pump to direct the solution from the container, through the first tube, and to the dispenser valve, and the controller controls the dispenser valve to direct the solution through the second tube into the exhaust pipe, such that the solution reacts with exhaust gas in the exhaust pipe.

12. The automotive anti-contamination system of claim 11, the solution further comprising a mixture water and calcium oxide.

13. The automotive anti-contamination system of claim 12, wherein the mixture of water and calcium oxide becomes calcium hydroxide when exposed to the heat from the exhaust pipe.

14. The automotive anti-contamination system of claim 11, wherein the exhaust pipe receives the exhaust gas from an engine.

\* \* \* \* \*